US006881464B2

(12) United States Patent
Waldman et al.

(10) Patent No.: US 6,881,464 B2
(45) Date of Patent: Apr. 19, 2005

(54) METHOD AND APPARATUS FOR PRODUCING OPTICAL RECORDING MEDIA WITH ACCURATELY PARALLEL SURFACES

(75) Inventors: David A. Waldman, Concord, MA (US); Rod Hopwood, Lexington, MA (US); Richard T. Ingwall, Newton, MA (US); YajPaul Panchu, Brighton, MA (US)

(73) Assignee: Aprilis, Inc., Maynard, MA (US)

( * ) Notice: Subject to any disclaimer, the term of this patent is extended or adjusted under 35 U.S.C. 154(b) by 63 days.

(21) Appl. No.: 10/146,497

(22) Filed: May 14, 2002

(65) Prior Publication Data

US 2002/0197440 A1 Dec. 26, 2002

Related U.S. Application Data

(60) Provisional application No. 60/290,743, filed on May 14, 2001.

(51) Int. Cl.[7] ................................................ B32B 3/02
(52) U.S. Cl. ..................... 428/64.1; 428/64.4; 156/288; 156/500
(58) Field of Search ............................ 428/64.1, 64.4, 428/652, 913; 430/270.11, 495.1, 945; 156/285, 288, 500, 580

(56) References Cited

U.S. PATENT DOCUMENTS

| | | | | |
|---|---|---|---|---|
| 4,985,289 A | * | 1/1991 | Kamezaki | ..................... 428/64 |
| 5,764,619 A | * | 6/1998 | Nishiuchi | ................ 369/275.1 |
| 5,874,187 A | | 2/1999 | Colvin et al. | |
| 5,932,045 A | * | 8/1999 | Campbell et al. | ........... 156/102 |
| 6,214,432 B1 | * | 4/2001 | Chullino | .................... 428/64.1 |
| 6,231,705 B1 | | 5/2001 | Kanashima et al. | |
| 6,348,983 B1 | | 2/2002 | Curtis et al. | |
| 6,596,104 B1 | * | 7/2003 | Tomiyama | .................... 156/64 |
| 6,671,073 B1 | | 12/2003 | Hegel | |
| 2002/0135829 A1 | | 9/2002 | Edwards et al. | |
| 2002/0136143 A1 | | 9/2002 | Edwards | |
| 2003/0070765 A1 | * | 4/2003 | Eichlseder | .................. 156/580 |

FOREIGN PATENT DOCUMENTS

| | | |
|---|---|---|
| EP | 0 762 409 A1 | 3/1997 |
| EP | 0 793 224 A1 | 9/1997 |
| EP | 1 005 037 A1 | 5/2000 |
| EP | 1 143 433 A1 | 10/2001 |
| EP | 1 177 887 A2 | 2/2002 |
| JP | 60 020337 | 2/1985 |
| JP | 61 251543 | 11/1986 |
| JP | 63 199614 | 8/1988 |
| JP | 04 149839 | 5/1992 |
| JP | 04 259935 | 9/1992 |
| JP | 08 007513 | 1/1996 |
| JP | 09 031417 | 2/1997 |
| WO | WO 96/31875 | 10/1996 |
| WO | WO 99/07542 | 2/1999 |

* cited by examiner

*Primary Examiner*—Elizabeth Mulvaney
(74) *Attorney, Agent, or Firm*—Hamilton, Brook, Smith & Reynolds, P.C.

(57) ABSTRACT

An apparatus and method that produces recording media using at least two platens. A first platen is movable relative to a second platen, and each platen has respective first and second support surfaces onto which substrates are placed, the first and second substrates each having inner and outer longitudinal surfaces. A centering device aligns the respective substrates relative to a one or more reference positions, a positioning system provides a degree of parallelism between the outer longitudinal surfaces of each of the substrates and produces a desired gap between the inner longitudinal surfaces of the substrates, and a dispensing unit which emits a liquid medium within the gap between inner longitudinal surfaces of the substrates.

84 Claims, 8 Drawing Sheets

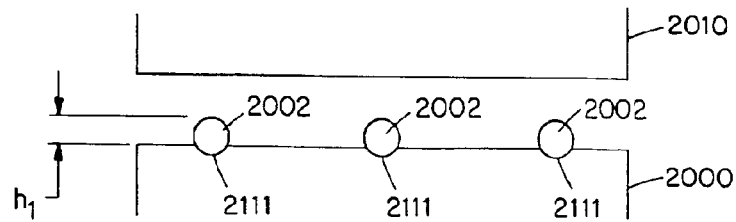
FIG. 6
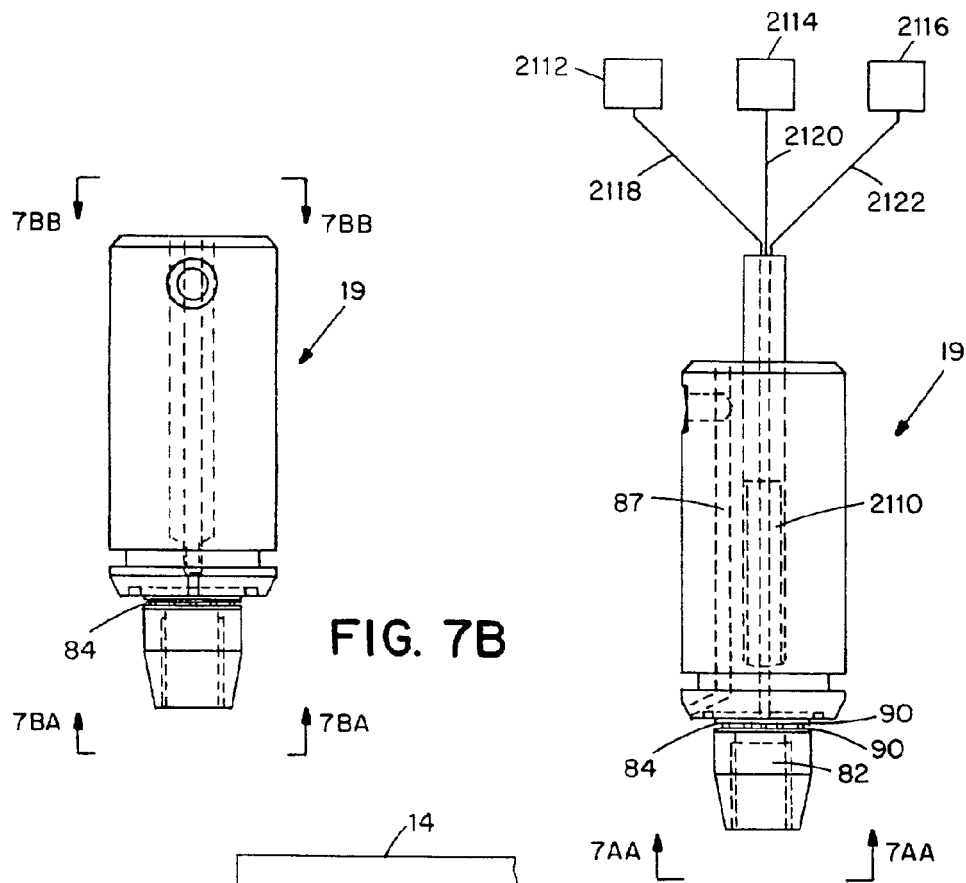
FIG. 7B
FIG. 7A
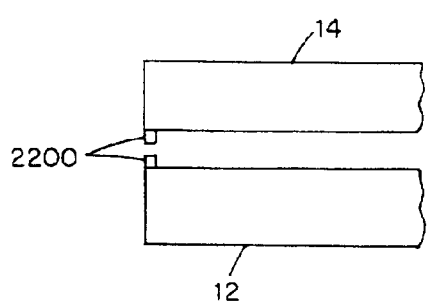
FIG. 8

METHOD AND APPARATUS FOR PRODUCING OPTICAL RECORDING MEDIA WITH ACCURATELY PARALLEL SURFACES

RELATED APPLICATION

This application claims the benefit of U.S. Provisional Application No. 60/290,743, filed May 14, 2001, the entire teachings of which are incorporated herein by reference.

BACKGROUND

This invention relates to a process for production of optical media in which either an active recording medium or a bonding layer is encased between two substrates.

Media used in certain optical data storage systems, for example digital holographic data storage or digital video disk (DVD), preferably require outer surfaces of the media to possess a high degree of parallelism in order to lessen the complexity of servo systems used in existing drives or those contemplated for holographic data storage. Methods utilized in the industry for preparation of reasonably flat optical media (e.g. bonding step in DVD manufacturing) are capable of implementing and maintaining reasonable consistency for the thickness of the polymerizable bonding or recording layer, but do not contemplate the benefits of the outer surfaces of the media having a high degree of parallelism.

SUMMARY

Such optical media processing systems have been accepted in the industry, and they are presumably considered to perform reasonably well for their intended purpose. However, they are not without their shortcomings. In particular, many of these systems are unable to account specifically for the existence of wedge in the substrates which encase the media, due to variations in the thickness of the substrates, or, additionally, the medium between the substrates due to tilt of one substrate with respect to the other. It is desirable, therefore, to produce optical recording media with accurately parallel faces. The present invention implements a system for the fabrication of disk media where a liquid recording or bonding material is sandwiched between reasonably rigid substrates, such that the outer surfaces of the finished media are of reasonable flatness and exhibit a high degree of parallelism. This system can also be implemented for media in the shape of a disk, square or rectangular card, or other geometry suitable for optical storage, for example, oval-shaped medium, or media having straight and curved edges.

In one aspect of the invention, a method for producing optical recording media includes aligning opposing support surfaces such that the opposing support surfaces are substantially parallel, and disposing at least one substrate on each respective opposing support surface, or both substrates on one opposing surface, each substrate having respective inner and outer longitudinal surfaces. Each substrate is aligned relative to one or more reference positions, and the substrates are positioned to secure a state of parallelism between the outer longitudinal surfaces of the substrates which is coincident with the parallelism provided by the opposing support surfaces. Optionally, the secured position of the substrates is locked to maintain the state of parallelism between the outer longitudinal surfaces of the substrates. Then the substrates are positioned to create a gap between the inner longitudinal surfaces of the substrates while maintaining the secured state of parallelism of the outer longitudinal surfaces of the substrates. A requisite amount of liquid is dispensed to provide a medium between the inner longitudinal surfaces of the substrates, and the liquid can be treated to stabilize the medium.

Embodiments of this aspect include one or more of the following features. The alignment of the substrates, in the case of disk type substrates or other substrates having a center hole, includes using a centering plug, and moving the substrates relative to each other includes using a three-point positioning system. The alignment of the substrates, such as those with at least one curved edge, can also be accomplished through the use of a two-point alignment along a curved edge, or the use of at least a three-point alignment of two or more straight edges. Alternatively, a pin expandable in diameter, or a collet can be applied to an inner diameter of the substrates.

The liquid medium can be dispensed through the centering plug under positive pressure so that the liquid medium flows from the center region of the substrates outward towards the outer edges of the substrates. Dispensing can also be achieved with suction or capillary action or by rotation of the substrates, or in combination with rotation of the substrates. Alternatively, the dispensing can occur through a device inserted into an inner diameter of the substrates. The liquid can be dispensed onto a substrate surface, for example, at a radius to form an annular region, or at two or more radii to form two or more annular or helical regions. The liquid medium can, by way of example, also be dispensed through a needle inserted in the gap between the substrates. In another embodiment, the liquid medium can be dispensed between the inner surfaces of the substrates from the outer edges to the inner edges of the substrates so that the liquid layer is uniform. A positive pressure can be applied to the substrates to create a compressive force on the liquid so that it flow towards the center and outer edges of the substrates. The substrates can be stationary or they can be spinning during the dispensing process.

The liquid medium is typically polymerizable and is treatable with heat treatment, actinic irradiation, and/or UV irradiation, or combinations thereof. In the case of square or rectangular shaped substrates, or substrates having both straight and curved edges, the liquid medium can also be dispensed under positive pressure, or by use of suction or capillary action, into the gap between the substrates so that it flows from along one edge to the opposing outer edge of the substrate. Alternatively, a positive pressure can be applied to the substrates to create a compressive force on the liquid so that it flows to form a uniform medium between the edges of the substrates. The substrates can have a thickness of about between 0.1 mm and 5 mm and a flatness of about ⅒ to 20 waves per inch. Further, the outer longitudinal surfaces of the substrates can have a parallelism between them of about between 10 µradians to 5000 µradians.

In another aspect of the invention, a method for producing optical recording media includes placing each of at least two substrates on a respective support surface; aligning the substrates relative to a center reference position in the case of disk-shaped substrates, or other reference positions, such as one or more edges in the case of square or rectangular-shaped substrates; locking or firmly securing the position of the substrates to secure a degree of parallelism; moving the substrates relative to each other until there is a desired gap between the inner surfaces of the substrates; dispensing a liquid between adjacent substrates to uniformly fill the gap between adjacent substrates with a requisite amount of liquid medium; and treating the liquid medium to stabilize the thickness of the liquid medium.

Embodiments of this aspect can include using a set of spacers that are either rigidly mounted or variably mounted to a reference surface. If the spacers are variably mounted, the height of the spacers can be adjusted with the aid of an optical measuring device which measures the tilt angle of the substrates, or with the aid of linear distance devices such as interferometric devices or strain gauges. Alternatively, one or more mechanical stops can be used to define the gap.

In yet another aspect of the invention, an apparatus for producing recording media include at least two platens, a first platen being movable relative to a second platen, and the platens having respective first and second support surfaces onto which respective first and second substrates are placed, the first and second substrates each having inner and outer longitudinal surfaces. The apparatus also includes a centering device for aligning disk-type substrates relative to a center reference position or includes a device for positioning one or more edges to a reference position for square or rectangular-shaped substrates, or substrates having at least one curved edge, and a three-point positioning system for providing a desired degree of parallelism between the outer surfaces of the substrates, and to produce a desired gap between the substrates. A locking device secures the desired degree of parallelism between the outer surfaces of the substrates, and a dispensing unit emits a liquid medium within the gap between the substrates. The liquid medium is stabilized with a treating device in a manner to preserve the thickness of the medium, and may also preserve the parallelism of the outer surfaces of the substrates.

The locking mechanism can include a ball that wedges between three tapered blocks to push the blocks against three rigid shafts of the positioning system to prevent movement of the three rigid shafts.

In some embodiments, the dispensing unit includes a single reservoir that holds the liquid medium. The reservoir, in the case of disk-type substrates, is directly connected to the centering hub, or other suitable device contemplated for dispensing the liquid medium, or alternatively is connected with a tube that transmits the medium from the reservoir to the centering hub or other suitable dispensing device. In other embodiments, the dispensing unit includes a multiplicity of reservoirs for holding a respective liquid medium. In the case of disk-type substrates, each such reservoir is connected directly to the centering hub or other suitable dispensing devices, or is connected with a respective tube to transmit the respective medium from the reservoir to the centering hub or other suitable dispensing device. The centering hub, or other suitable dispensing devices in the case of square or rectangular-shaped substrates, or substrates containing at least one curved edge, can contain a mixing chamber when the dispensing unit includes a multiplicity of reservoirs. The mixing chamber can contain structural elements or protrusions. As the flow of liquids introduced into the chamber encounters these protrusions, turbulence is produced in the liquids, which facilitates mixing of multiple liquid components into a uniform solution.

The inner surface of each substrate can be provided with a raised portion along the outer region of the substrates. The raised portions reduce the distance between the inner surfaces of the substrates. The three-point positioning system can include rigid mounting spacers or variable mounting spacers for defining a desirable gap between the inner surfaces of the substrates.

Among other advantages, the foregoing system and method permits preparation of media capable for use in optical recording that require a high degree of parallelism of the outer surfaces of the substrates. Such a system and method takes into account and compensates for the wedge in the substrates. Furthermore, it provides a means by which liquid materials can be introduced between substrates into gaps of various dimensions, and the liquid is uniformly distributed within the gap without the presence of air bubbles. If the liquid media are polymerizable then this system and method provides a way for reacting the material by thermal and/or photo-chemical methods so as to secure and maintain the defined parallelism between outer surfaces of the substrates of the media. The system and method described for dispensing the fluid material within the gap dimensions can be used for a wide range of viscosities for fluids used or contemplated for use in DVD bonding or bonding of other types of optical storage media such as disks of other sizes or cards, and/or holographic recording media. The methods described for securing and maintaining the defined high degree of parallelism between outer surfaces of the substrates can also serve as providing for structural features that are useful for optical servo systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessary to scale, emphasis instead being placed upon illustrating the principles of the invention.

FIG. 6 is another alternative embodiment of a three-point positioning system.

FIGS. 7A and 7B illustrate an alternative embodiment of a centering hub to dispense multiple liquid media.

FIG. 8 is a side view of a pair of substrates provided with gaskets or raised portions to prevent the overflow of liquid medium beyond the outer edges of the substrates.

DETAILED DESCRIPTION OF THE INVENTION

A description of preferred embodiments of the invention follows.

Figure 1:
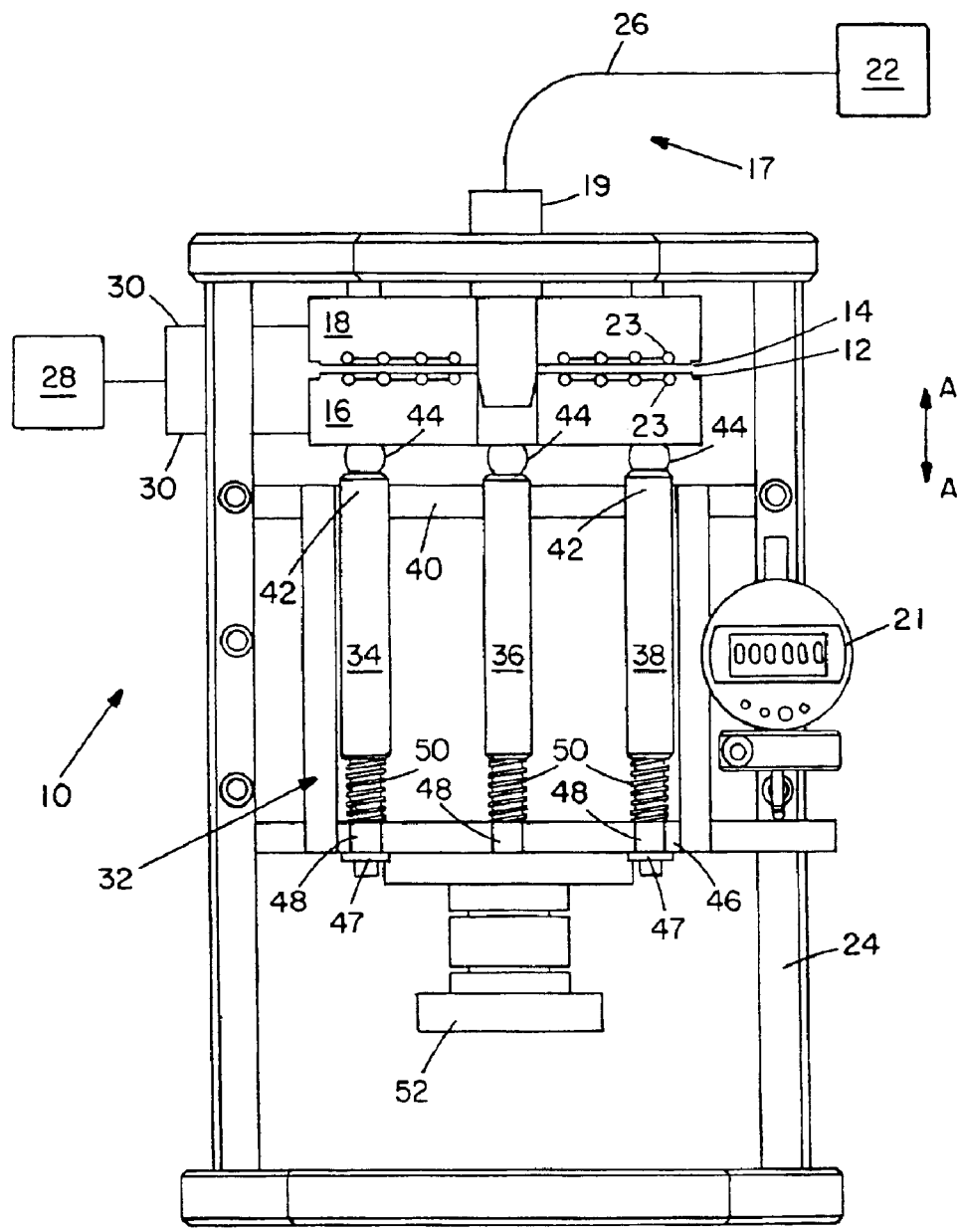
FIG. 1 is a front view of an optical recoding media producing system in accordance with the invention.

The optical recording media producing system of the present invention is illustrated generally at 10 in FIG. 1. The media producing system 10 is a system to fabricate optical media in which an active recording medium (or a bonding layer as used in DVD technology) is encased between two substrates. A particular feature of the system 10 is that it is able to produce a medium with a high degree of parallelism between the outer surfaces of the substrates. Additionally, the medium is produced uniformly without the presence of trapped gas bubbles within the medium. Each substrate may be a single sheet or disk of plastic or glass, or may consist of laminated sheets or disks of plastic and/or glass that sandwich other bonding or recording layers. The sheet may be square or rectangular or oval, or have a shape of any other suitable geometry that may contain straight and/or curved edges.

As an overview, when the system 10 is in use, an operator places each of two substrates 12, 14 on a respective support surface, such as the inner surfaces of a lower platen 16 and an upper platen 18. These platens are fabricated to provide a high degree of surface flatness and surface quality that may generally be referred to as optical flatness. A desired degree of parallelism between the inner longitudinal surfaces of the platens, i.e., the opposing support surfaces, is achieved and the state of parallelism is secured such that the inner longitudinal surfaces of the platens are substantially parallel before the substrates are placed on the platens.

Once placed on the platens, the central axes with respect to the longitudinal surfaces of the substrates, if they are disk-type substrates, are aligned to a center reference position with a centering hub 19, and the substrates 12, 14 are then brought together so that the inner surfaces of the substrates 12, 14 are in contact with each other. The center-aligned positions of the disk-type substrates are maintained by securing the substrates to the platens, thereby establishing and locking in parallelism between the outer longitudinal surfaces of the substrates to maintain the achieved level of parallelism between the platens. Similarly, aligned positions of square or rectangular-shaped substrates or other suitably shaped substrates are maintained by securing the substrates to the platens, thereby establishing and locking in parallelism between the outer surfaces of the substrates to maintain the achieved level of parallelism between the platens. The substrates can have a thickness of about between 0.1 mm to 5 mm and have a flatness of about $1/10$ to 20 waves per inch. The parallelism between the longitudinal outer surfaces of the substrates is about between 10 $\mu$radians and 5000 $\mu$radians.

The substrates are then brought slightly apart, for example, by dialing in a gap with a control panel 21. A dispensing unit 17, which includes a dispensing reservoir 22 connected to the centering hub 19, in the case of disk-type substrates, with a tube 26, dispenses a liquid medium from the centering hub 19 and into the defined gap between the substrates 12, 14. Similarly, the dispensing unit 17, which includes the dispensing reservoir 22 and the tube 26, or some other means of carrying the fluid, dispenses a liquid medium from along one edge of rectangular or square-shaped substrates or other suitably shape substrates, or from any other region between the substrates into the defined gap between the substrates.

After the liquid medium fills the gap, a treating device 23 is used to stabilize the liquid medium that is usually a polymerizable substance. Alternatively, rather than using the centering hub 19 to center the substrates and to dispense the liquid medium, a separate centering device can be used to center the substrates, and then a different dispensing hub can be employed to dispense the liquid. Particular features of the system 10 and the process to produce the recording medium are described in detail below.

The system 10 also includes a vacuum source 28 which is connected to both the lower and upper platens 16, 18 with a set of vacuum lines 30. The lower and upper platens 16, 18 are provided with a series of holes connected to submerged tracks (not shown) so that the vacuum source 28 draws a vacuum through the lines 30 and the series of holes in each of the platens to create suction in the submerged tracks to hold the substrates to the platens. In the embodiment shown in FIG. 1, the upper platen 18 is rigidly affixed to the upper portion of a support base 24 of the system 10. The lower platen 16, on the other hand, moves up and down in the direction of the double arrow A—A. Alternatively, the substrates 12, 14 can be secured to the platens by any other suitable mechanism, and/or the upper platen 18 is moveable while the lower platen 16 remains stationary.

The system 10 is provided with a three-point positioning system 32 that facilitates aligning the substrates 12, 14 so that the outer surfaces of the substrates are highly parallel. The positioning system 32 includes three rigid shafts 34, 36, and 38, each shaft having an upper end protruding into an upper frame 40 and provided with a V-shaped groove 42 in which a ball 44 sits. The lower platen 16 sits on top of the three balls 44. The three rigid shafts 34, 36, and 38 are positioned to provide a three-point support for the lower platen 16. The lower ends of the rigid shafts 34, 36, and 38 are mounted in a lower frame 46 in a manner which allows the lower ends to slide up and down in a respective hole 48 of the lower frame 46. The lower ends of the rigid shafts 34, 36, and 38 are also provided with a set of springs 50 which are arranged to push the rigid shafts 34, 36, and 38 away from the lower frame 46. An enlarged end 47 of each shaft 34, 36, and 38 has a diameter that is larger than the diameter of the respective holes 48 to prevent the shafts from completely sliding out of the holes 48.

The lower frame 46 is also able to move up and down in the direction of the double arrow A—A. The lower frame 46 is connected to a stationary drive motor 52 through a screw drive 54 (or, alternatively, a piston driven by hydraulic or gas pressure). The lower frame 46 and the screw drive 54 are coupled together in a manner that converts rotary motion of the screw drive 54 to linear movement of the lower frame 46. Hence, as the lower frame 46 moves upwards, a compressive force is imparted to each of the rigid shafts 34, 36, and 38 through the respective springs 50. Note that each of the shafts 34, 36, and 38 are moveable independently of each other. Thus as the lower frame 46 moves upward, the compressive force imparted to each shaft is transferred to the base of the lower platen 18 in a manner such that the compressive force can differ to facilitate adjusting and reducing the tilt of the inner surface of the lower platen 16 relative to the inner surface of the upper platen 18.

Figure 2A:
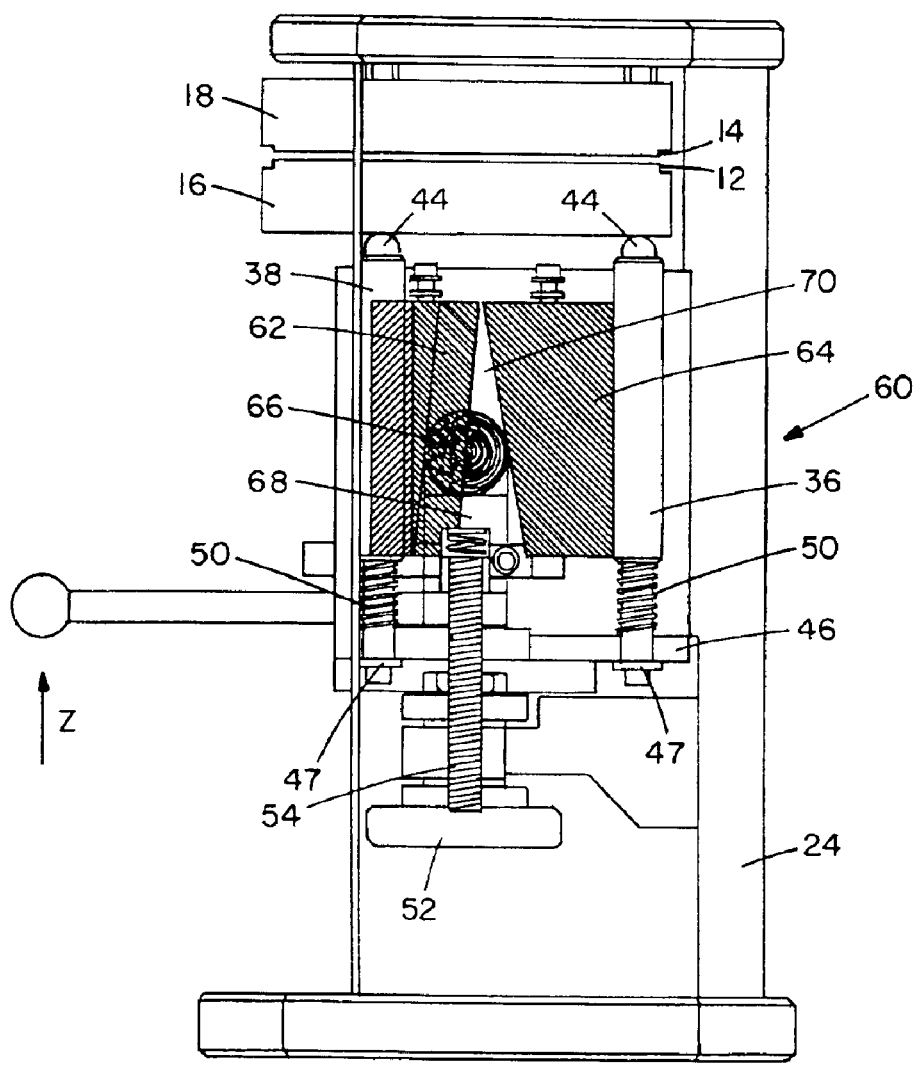
FIGS. 2A and 2B are side views of the optical recording media producing system of FIG. 1.
Figure 2B:
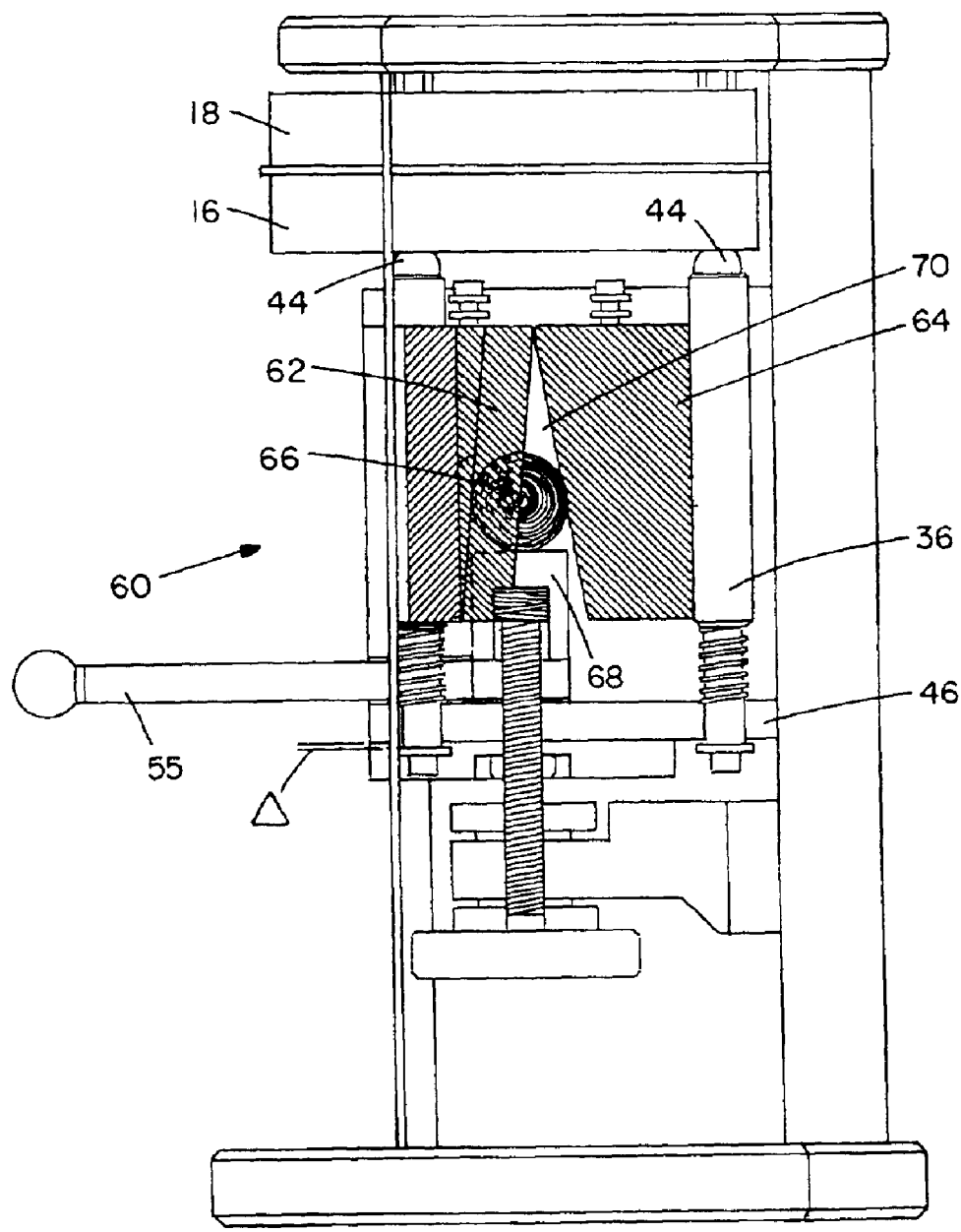
Figure 2C:
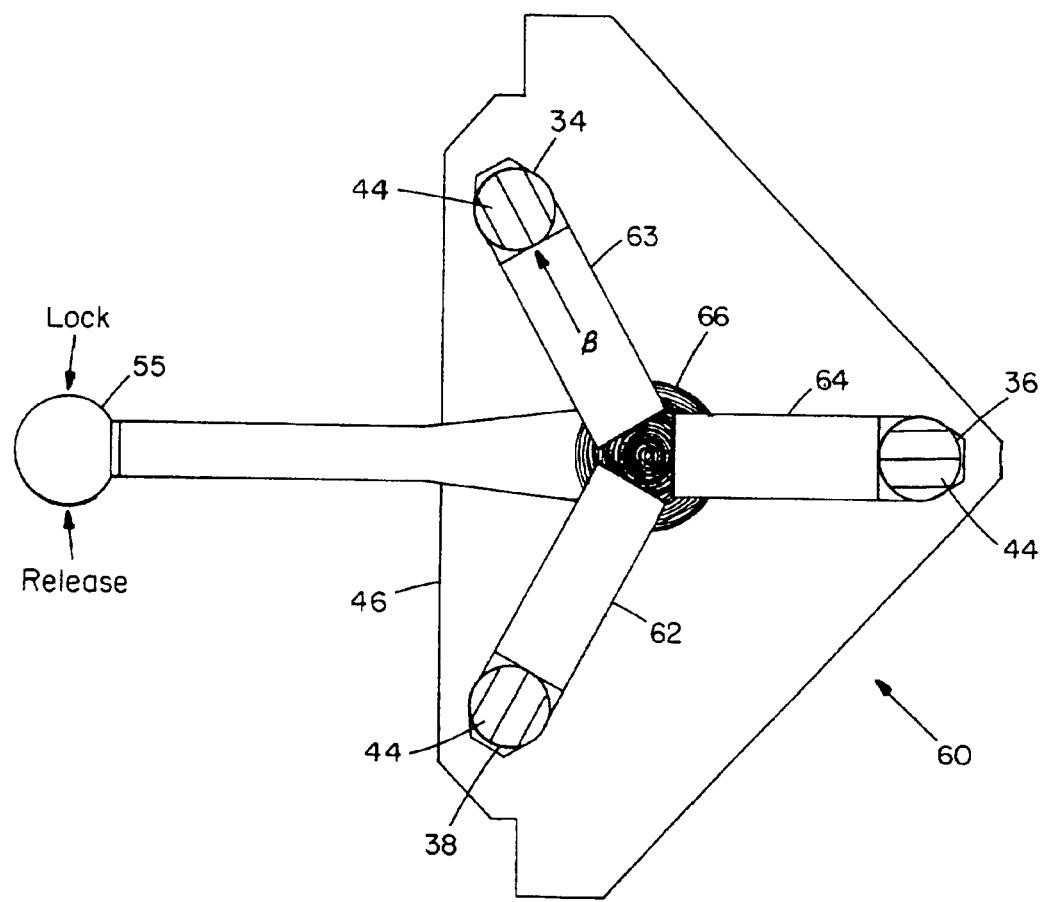
FIG. 2C is a top view of a locking mechanism of the system of FIG. 1.

Referring now to FIGS. 2A and 2C, there is shown a locking mechanism 60 used to secure the lower and upper platens 16, 18 in place after the desired degree of parallelism has been achieved. The locking mechanism 60 includes three tapered blocks 62, 63, and 64. A ball 66 that is positioned directly above a moveable platform 68 is located within a cone shaped inner region 70 defined by the three tapered blocks 62, 63, and 64. The three tapered blocks 62, 63, and 64 move independently from one another and are positioned next to a respective rigid shaft 38, 34, and 36.

After the drive motor 52 rotates the screw drive 54 to move the lower platform 46 and hence the lower platen 16 upwards such that the inner surfaces of the platens 16, 18 achieve the desired degree of parallelism, the lower platform 46 will be slightly deflected as indicated by "Δ" (FIG. 2B). The operator locks the lower platen 16 in place by moving a handle 55 into a locking position (the locking mechanism is released by moving the handle 55 in the opposite direction). The movement of the handle 55 causes the platform 68 and hence the ball 66 to rise upwards. As the ball 66 moves upwards, it pushes against the inner surfaces of the three tapered blocks 62, 63, and 64 in a manner that causes the three tapered blocks to move outwards in the direction of the arrow B against the rigid shafts 34, 36, and 38. The position of the ball 66 is locked in place such that friction between the outer surfaces of the three tapered blocks 62, 63, and 64 and the respective rigid shafts 38, 34, and 36 prevents the shafts from moving. Other methods of securing and locking the positions of the platens 16, 18 to achieve the desired degree of parallelism between the inner surfaces of 16, 18 are also contemplated.

Figure 3:
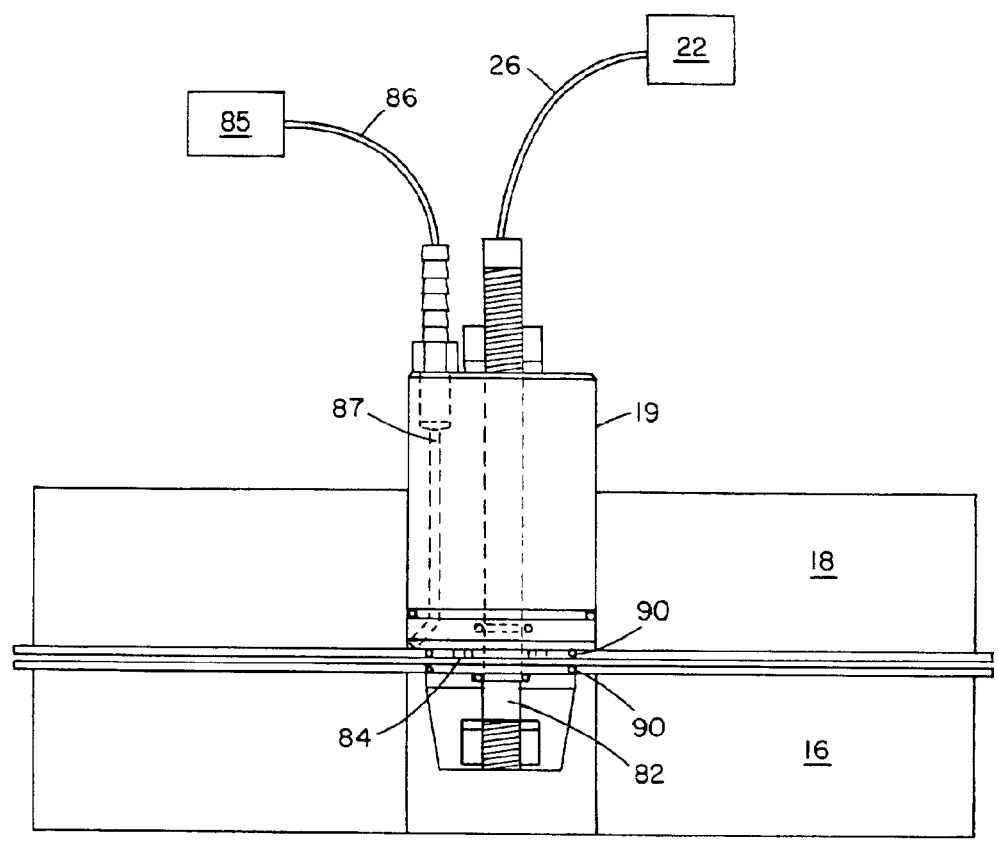
FIG. 3 is a side view of a centering hub to align substrates and dispense a liquid medium between adjacent substrates.

Referring now to FIG. 3 and back to FIG. 1, to fill the gap between the substrates 12, 14, the liquid medium flows from the dispensing reservoir 22, in the case of disk-type substrates, to the centering hub 19 and collects in an inner chamber 82 of the centering hub 19. From the inner chamber 82, the liquid medium is emitted through a series of horizontal orifices 84, extending from the inner chamber 82 to the outer surface of the centering hub 19, and fills the entire gap region between the two substrates 12, 14. Alternatively, the liquid medium is emitted through a continuous orifice from the inner chamber 82. The tube 26 is made of stainless steel, Teflon, Teflon coated tubing, or any other suitable material that is chemically inert to the liquid medium. The centering hub 19 is provided with two O-rings 90 that form a seal with the inner edges of the substrates 12, 14 to prevent the liquid medium from flowing between the centering hub 19 and the outer surfaces of the substrates 12, 14. Other methods of providing a seal with the substrates to prevent the liquid medium from flowing onto the outer surfaces of the substrates 12,14 are also contemplated.

In one embodiment, a vacuum pump or source 85 is connected to the centering hub 19 with a tube 86, and the centering hub 19 is provided with an inner channel 87 extending from the point of connection with the tube 86 to a region above the top O-ring 90. The vacuum source 85 draws a vacuum to seal the centering hub 19 by suction to the substrates, so that the medium can be dispensed under specific environmental conditions, such as, for example, anhydrous and/or anaerobic conditions exclusively to the region of the gap between the substrates. Alternatively, the dispensing device can be sealed by application of suction in a manner such that the device seals to the outer surface of the topmost substrate and to the bottom platen such as within the inner diameter of the platen. As the dispensed liquid flows uniformly in the radial direction from the centering hub 19 to the outer edges of the substrates 12, 14, the defined gap dimension between the inner surfaces of the substrates 12, 14 remains fixed. Further, the dispensed liquid medium uniformly displaces the gas between the inner surfaces of the substrates 12, 14 as the liquid medium flows towards the outer edges of the substrates 12, 14, thereby forming a uniform liquid layer of a defined thickness void of any trapped gas bubbles. The positive pressure setting used to dispense the liquid medium can be adjusted in accordance with the viscosity of the fluid to ensure rapid dispensing of the liquid into the region between the substrates 12, 14. Alternatively, the requisite amount of fluid can be dispensed by linear motion of a piston that is located within the dispensing device or at a suitable position outside the device, such as by a cylindrical piston that is positionally controlled by use of hydraulic or gas pressure or other suitable means that may for example use actuators.

The liquid medium is typically polymerizable such that it can be treated and stabilized in a number of ways. For instance, the treating device 23 (FIG. 1) used to stabilize the liquid medium after it has been dispensed can be a series of light emitting diodes (LEDs) positioned over the inner surfaces of one or both platens. The LEDs emit visible radiation that is transmitted through the transparent substrates to the liquid medium. Alternatively, UV radiation, actinic radiation, or heat treatment sources can be used alone or in combination to stabilize the liquid medium. If UV or actinic radiation is employed, the polymerizable liquid must be photo-chemically active to the wavelength of the radiation. Alternatively, or in combination with above, the edges of the polymerizable liquid medium at or near the edges of the substrates can be treated by application of UV radiation, actinic radiation, or heat treatment sources. Typical sources of actinic radiation include LEDs, laser diodes, other laser sources, strobe flash sources such as Xenon flash units, incandescent sources, halogen lamps, and the like.

Figure 4:
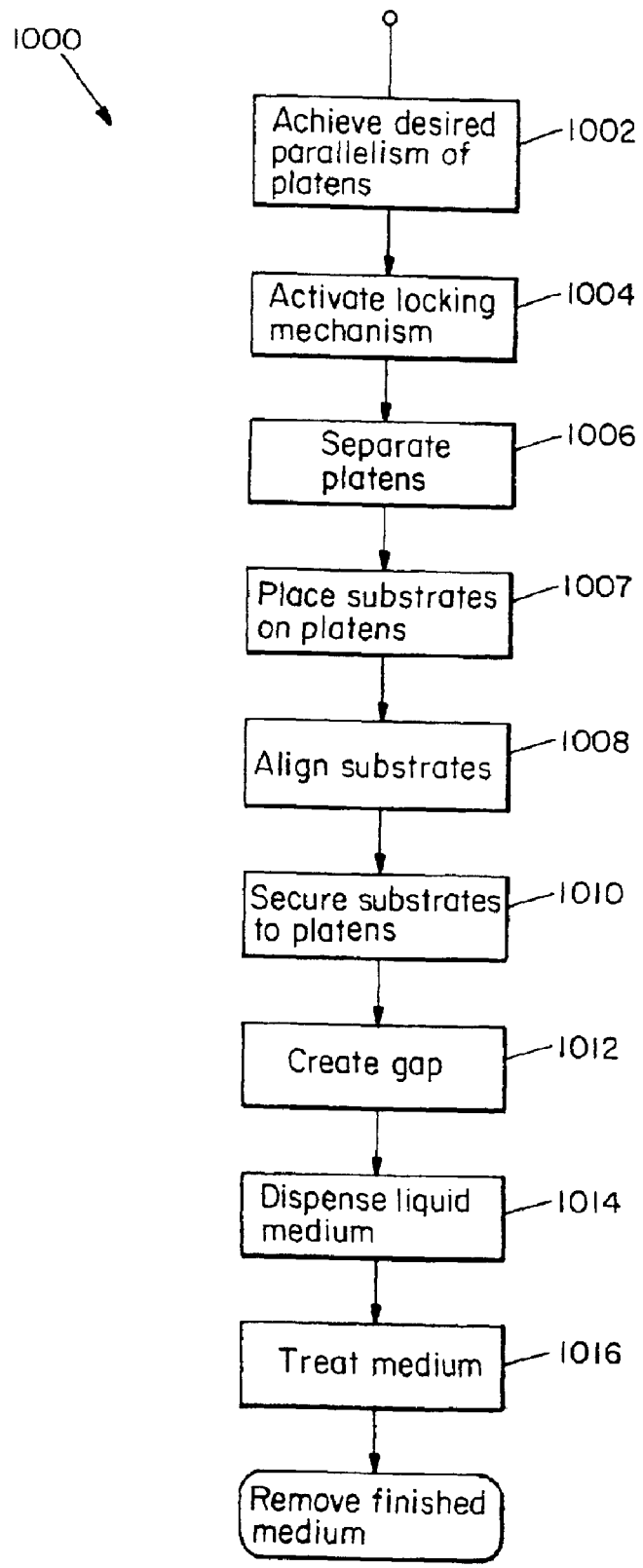
FIG. 4 is a flow diagram of a sequence of automated steps to produce optical recording media.

Referring now to FIG. 4, there is shown a process 1000 for fabricating optical recording media with the system 10.

First, in a step 1002, the operator or computer controller activates the drive motor 52 thereby raising the lower frame 46 in the Z-direction. Hence, the lower platen is 16 is moved upwards until it is in contact with the upper platen 18. The two platens are brought together so that there is no gap between them. The uniform intimate contact between the inner longitudinal surfaces of the platens defines the desired high degree of parallelism such that the inner longitudinal surfaces of the platens are substantially parallel.

Next, in a step 1004, the locking mechanism 60 is activated to secure the state of parallelism achieved between the inner surfaces of the platens 16, 18.

Subsequently, in a step 1006, the drive motor 52 separates the platens 16, 18 to adjust the distance between the platens so that the substrates 12, 14 can be positioned between the platens. Then in a step 1007 the substrates 12, 14 are placed separately or together on opposing inner surfaces of the respective platens 16, 18. That is, each substrate can be placed on respective opposing inner surfaces or both substrates can be placed on one opposing inner surface.

Next, in a step 1008, the operator uses the centering hub 19 to align the central axes of the substrates 12, 14 to a reference center position or location. In this embodiment, for example, the center plug 19 is inserted in the inner diameter holes of the platens 16,18 and the substrates 12, 14 to align the substrates relative to each other and to the center of the platens. Alternatively, a two-point alignment system can be used that, for example, touches two points along the curved surface of the substrates 12, 14 in a manner such that the touch points are located at a fixed position relative to the reference center location of the platens, or a pin expandable in diameter, or a collet can be applied to the inner diameters of the substrates. Then in a step 1010, the substrates 12, 14 are secured to the platens 16, 18 with a suction created with a vacuum drawn by the vacuum source 28.

Afterwards, in a step 1012, the drive motor 52 raises the lower frame 46 in the Z-direction. Hence, the lower platen 16 is moved upwards until the lower substrate 12 is in contact with the upper substrate 14 secured to the upper platen 18. The two substrates 12, 14 are brought together to define the zero gap position between the two substrates. The uniform intimate contact between the outer longitudinal surfaces of the substrates and the inner longitudinal surfaces of the platens assures that the desired high degree of parallelism between the outer surfaces of the substrates 12, 14 is coincident with the parallelism exhibited between the inner surfaces of the platens 16, 18. Then, as the top platen 18 remains fixed in place, the lower platen 16 is moved in the Z-direction to provide the desired gap between the inner opposing surfaces of the two substrates 12, 14. Note that while the lower platen 16 is moved, the achieved state of parallelism is unperturbed. Alternatively, the lower platen 16 is moved in the Z-direction to a defined location, such as by use of one or more mechanical stops, to provide the desired gap between the inner opposing surfaces of the two substrates 12, 14.

Next, in a step 1014, the liquid medium is dispensed through the centering plug 19 to fill the space of the gap between the inner surfaces of the substrates 12, 14. In particular, the fluid is emitted through the horizontal holes 84 of the centering hub 19 under positive pressure so that the fluid flows outward from the centering hub 19 towards the outer edges of the substrates 12, 14 to fill the entire gap between the two substrates. Although the fluid is under a positive pressure, the O-rings 90 prevent the fluid medium from flowing into the region between the centering plug 19 and the inner edges of the substrates 12, 14.

Alternatively, the liquid medium can be dispensed through a device inserted near the inner edge of the substrates. The device can dispense the liquid medium onto the substrate surface, for example, at a radius to form an annular region, or at two or more radii to form two or more annular or helical regions. The liquid medium can alternatively be dispensed between the inner surfaces of the substrates from the outer edges to the inner edges of the substrates to form a uniform liquid layer. A needle can be inserted into the gap between the substrates through which the liquid medium is dispensed. Furthermore, by applying a positive pressure to the substrates, a compressive force can be applied to the liquid medium so that the liquid medium flows towards the center and the outer edges of the substrates to form a uniform liquid layer. The compressive force can be applied while the substrates are stationary, or while they are spinning.

After the medium fills the gap between the substrates, the medium is treated with UV radiation emitted from the treating device 23, in a step 1016, to stabilize the structure of the medium. Alternatively, actinic radiation or heat treatment, or combinations thereof, can be used to treat the polymerizable liquid layer.

Application of heat treatment or irradiation can be directed to regions of dispensed liquid located between the inner surfaces of substrates and abutting the inner and outer edges of the substrates. For example, these regions can be circular in a continuous track around the disk near the outer and inner edges of the disk, or the regions can be helical shaped tracks. In another embodiment, application of heat or irradiation can occur additionally or independently at locations between the inner and outer edges of the substrates, which by way of example could be other continuous tracks of different radii, or small circular spots at locations arranged in concentric rings or helical shaped tracks, about the center hole of the substrates 12, 14. Other examples include application of heat or irradiation to create localized polymerized regions in the form of discrete spots of various geometric shapes and sizes at particularly desirable locations. These spots can be fully separated, or perhaps partially overlapping, in groups of spots. Such groups could be abutting or separated from other such groups. By way of example, these spots can be located in circular or helical type tracks around the disk at any desired location of the disk, or in rows or columns or other particularly useful configurations at any desired location in the case of square or rectangular-shaped or other suitably shaped substrates. The extent of polymerization resulting from the heat or irradiation treatment is sufficient to form locations of polymerized structure that exhibit requisite mechanical integrity, and the dimensions of the spots or rings, in which such polymerization takes place, is sufficient to provide for overall requisite mechanical integrity to maintain the state of parallelism.

The regions that are polymerized for the purpose of maintaining the high degree of parallelism between the outer surfaces of the substrates can also be used as structural features designed for providing servo features in the finished optical media. For example, if the polymerized regions are created in a manner that results in formation of holograms at these locations, then changes in reflectivity from these regions, due to diffraction by the holograms, can be used for optical servo methods. For example, reflection holograms can be recorded in these regions during light induced polymerization by use of light emitting devices, such as diodes or lasers or flash lamps. The locations of these reflection holograms can be used to diffract light of a particular wavelength at a particular angle useful for optical servo systems.

Figure 5A:
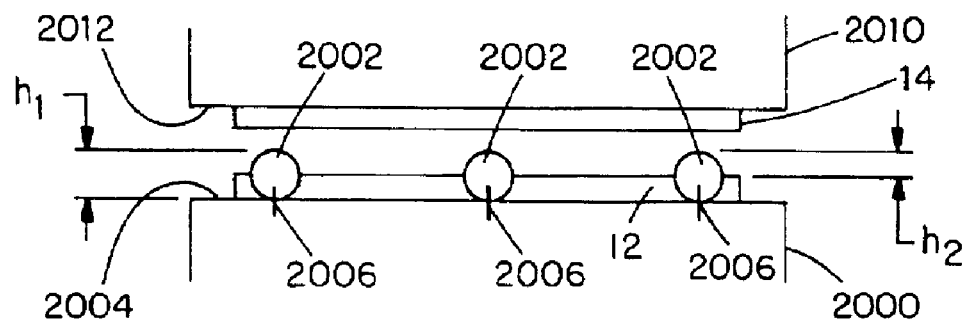
FIGS. 5A and 5B is an alternative embodiment of a three-point positioning system for the media producing system of FIG. 1.
Figure 5B:
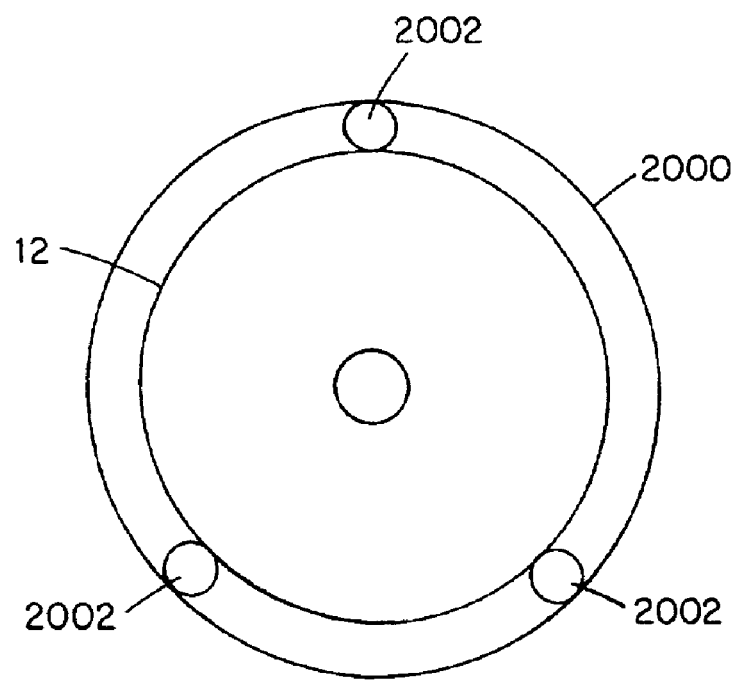

In the embodiment described above, the gap between inner surfaces of the substrates 12, 14 is created by moving the lower platen away from the upper platen a predetermined distance as dialed in with the control panel 21. There are, however, other mechanisms that can be used to create this gap. For instance, there is shown in FIGS. 5A and 5B, a lower platen 2000 provided with a set of three rigid spacers 2002 shaped as spherical balls which sit on top of an inner surface 2004 (serving as a reference surface) of the bottom platen 2000 and are secured to the bottom platen 2000 with a respective pin 2006. The three spacers are positioned equidistance from each other about the outer region of the lower platen 2000, but may be positioned at any suitable distance from each other about the outer region or inner regions of the lower platen 2000 or any other region that is inside and/or outside of where substrates will be positioned. A gap, "$h_1$", is created between the two platens by moving the lower platen 2000 towards an upper platen 2010 with, for example, a drive mechanism as described above, until the top of the three spacers 2002 are in contact with the inner surface 2012 of the upper platen 2010. Alternatively, the lower platen 2000 can be stationary while the upper platen 2010 is moved. In either case, the gap "$h_1$" between the inner surfaces of the upper platen 2010 and the lower platen 2000 is the same as the diameter of the three spacers 2002 and would be equal to the aggregate of the thickness of the substrates and the desired thickness of the liquid medium. In the case of a multiplicity of square or rectangular-shaped substrates positioned between inner surfaces of the platens 2004, 2012 there may be more than three of such rigid spacers 2002 shaped as spherical balls which sit on top of an inner surface 2004 (serving as a reference surface) of the bottom platen 2000. In other embodiments, the gap is defined with the use of one or more mechanical stops, or is defined by the use of one or more linear distance sensors, such as, for example, linear transducers, strain gauges, or zero crossings of a laser frequency like that used to control the movement of interferometers. These linear distance sensor can also be used to aid in adjusting the location of the mechanical stops. In certain embodiments, an optical measuring device that measures the tilt angle of the substrates is used to secure the desired degree of parallelism. With these types of devices, the positions of the support surfaces are adjusted until the surface reflection from the outer surfaces of the substrates are co-linear.

In use, the substrates 12, 14 are placed on a respective platen 2000, 2010 and secured to the platens, for example, by suction with a vacuum drawn with the vacuum source 28 (FIG. 1), and then, in the case of disk-type substrates, centered as described above with the centering hub 19 or by using, for example, locator pins, and in the case of square or rectangular-shaped substrates or other shapes comprising at least one straight or curved edge, aligned along one or more edges by using, for example, locator pins or bars or other suitable positioning devices. Thus, a gap "$h_2$" is created after the two platens 2000, 2010 are brought together with the top of the spacers 2002 in contact with the inner surface of the upper platen 2010. In essence, the gap $h_2$ defines the thickness of the medium that is dispensed between the two substrates 12, 14.

The spacers 2002 and the surface flatness of the inner surfaces of the upper platen 2010 and the lower platen 2000 are fabricated to a particular tolerance to ensure that the desired degree of parallelism is produced during the fabrication process. Note that the spacers 2002 can be mounted to the upper platen 2010 instead of to the lower platen 2002. Further, the spacers 2002 can be held in place with a respective indentation 2111 (FIG. 6) rather than with the pins 2006. Also, other spacers having suitable geometries can be used in place of the spherically shaped spacers 2002.

Although the spacers 2002 are rigidly mounted to the lower platen 2000, the spacers need not be of uniform height. In such an embodiment, the pins 2006 could be replaced with a height adjusting mechanisms so that the height of these variable mounted spacers are independently adjustable relative to a respective platen by the use of gear mechanisms, for example, or alternatively pistons moved with hydraulic or gas pressure. To properly adjust the height of the spacers, an optical measure of the tilt angle of the substrates 12, 14 can be interactively employed, such as, for example, by using the first and second reflections off the substrates from locations near the spacers. The height of the variable mounting spacers are adjusted until the surface reflections from the outer surfaces of the substrates 12, 14 are co-linear, at which point the desired parallelism between the outer surfaces of the substrates is achieved. The positions of the variable mounting spacers are then secured in place by using a locking system or any other suitable system to hold the positions of the spacers in place.

Although in the embodiment shown above, a single liquid medium is dispensed between the substrates, there is shown in FIGS. 7A and 7B the centering hub 19 provided with a mixing chuck 2110 that facilitates mixing of multiple liquid media, for example, three liquid media. In this embodiment, the centering hub 19 is connected to three dispensing reservoirs 2112, 2114, and 2116 with a respective fluid transmission line 2118, 2120, and 2122. The fluids from the three reservoirs are transmitted through these lines to the mixing chuck 2110 where the fluids are mixed together and then collected in the inner chamber 82 before the mixed fluid is emitted through the horizontal orifices 84 into the region between the substrates 12, 14. The mixing chuck 2110 can be provided with a series of inner protrusions. As the media encounters the protrusions and deflected past the protrusions, they mix together under turbulent conditions. In such an arrangement, air sensitive medium provided by one reservoir can be mixed in the mixing chuck 2110 with moisture sensitive medium provided by another reservoir and photosensitized medium provided by the third reservoir.

In many applications, the viscosity of the liquid medium is high enough such that surface tension effects substantially prevent the liquid medium from flowing out beyond the outer edges of the substrates 12, 14. However, in some applications, for example, those which may require a thick medium and/or those which use a liquid medium of low viscosity, the surface tension effects may not prevent the medium from flowing rapidly past the edges. In these applications, the inner surfaces of the substrates 12, 14 can be provided with gaskets 2200 (FIG. 8) (or protrusions molded with the substrates) along the outer edges of the substrates which reduces the spacing between the inner surfaces of the substrates at the outer edges. These gaskets, therefore, effectively increase the surface tension effects in that region to prevent the liquid medium from flowing past the outer edges of the substrates 12, 14. Alternatively, the edges of the polymerizable liquid medium at or near the edges of the substrates can be treated by application of UV radiation, actinic radiation, or heat treatment sources simultaneous with the liquid reaching the edge regions.

While this invention has been particularly shown and described with references to preferred embodiments thereof, it will be understood by those skilled in the art that various changes in form and details may be made therein without departing from the scope of the invention encompassed by the appended claims. For example, the liquid medium can be drawn into the gap between the two substrates by capillary forces, by suction, and/or by injection of liquid into the gap region followed by spinning of the substrates to allow uniform spreading of the liquid.

What is claimed is:

1. A method for producing optical recording media, comprising the steps of:
    aligning opposing support surfaces such that the opposing support surfaces are substantially parallel;
    disposing each of at least two or more substrates on a respective opposing support surface or the at least two or more substrates together on a single opposing support surface, the substrates having respective inner and outer longitudinal surfaces;
    aligning the substrates relative to one or more reference positions;
    positioning the substrates to secure a state of parallelism between the outer longitudinal surfaces of the substrates which is coincident with the parallelism provided by the opposing support surfaces;
    positioning the substrates to create a gap between the inner longitudinal surfaces of the substrates while maintaining the secured state of parallelism of the outer longitudinal surfaces of the substrates; and
    dispensing a requisite amount of liquid to provide a medium between the inner longitudinal surfaces of the substrates, wherein during dispensing the liquid is in contact with inner longitudinal surfaces of the at least two substrates.

2. The method of claim 1, wherein the support surfaces are provided by rigid reference platens.

3. The method of claim 1, wherein the substrates are circular disks.

4. The method of claim 1, wherein the substrates are square shaped, rectangular shaped, or oval shaped.

5. The method of claim 1, wherein the substrates have a center hole.

6. The method of claim 1, wherein the substrates are glass or plastic.

7. The method of claim 1, wherein the substrates have one or more straight edges.

8. The method of claim 1, wherein the substrates have one or more curved edges.

9. The method of claim 1, wherein the substrates have a thickness of about between 0.1 mm to 5 mm and have a flatness of about between $\frac{1}{10}$ to 20 waves per inch.

10. The method of claim 1, wherein the substrates have a thickness of about between 0.1 mm to 5 mm and wherein the step of positioning the substrates secures a parallelism between the longitudinal outer surfaces of about between 10 $\mu$radians to 5000 $\mu$radians.

11. The method of claim 1, wherein aligning a reference portion of the substrates and dispensing includes using a centering plug.

12. The method of claim 1, wherein aligning the substrates includes using a centering device.

13. The method of claim 1, wherein aligning the substrates includes using a two-point alignment along a curved edge.

14. The method of claim 1, wherein aligning the substrates includes using a three point alignment of two or more straight edges.

15. The method of claim 1, wherein aligning the opposing support surfaces includes using a three-point positioning system.

16. The method of claim 1, wherein positioning the substrates includes using a three-point positioning system.

17. The method of claim 1, wherein the substrates have an inner diameter, and positioning the substrates includes using a device applied through a respective inner diameter of the substrates.

18. The method of claim 1, wherein dispensing includes dispensing the liquid into the gap between substrates.

19. The method of claim 18, wherein dispensing includes dispensing the liquid through a centering device used to align the substrates relative to a center reference position.

20. The method of claim 1, wherein dispensing includes dispensing the liquid through a device inserted into the inner diameter of one or more disk substrates.

21. The method of claim 1, wherein dispensing includes dispensing the liquid onto the substrate surfaces.

22. The method of claim 1, wherein dispensing includes sealing the gaps between a device used for dispensing the liquid and the inner edges of the substrates.

23. The method of claim 1, wherein dispensing includes applying a positive pressure to the liquid so that it flows from the center region of the substrates outward towards the outer edges of the substrates.

24. The method of claim 1, wherein dispensing includes dispensing the liquid onto the substrate surfaces at a radius to form an annular region.

25. The method of claim 1, wherein dispensing includes dispensing the liquid onto the substrate surfaces at two or more radii to form two or more annular or helical regions.

26. The method of claim 1, wherein dispensing includes dispensing the liquid between the inner surfaces of the substrates from the outer edges to the inner edges of the substrates so that the liquid layer is uniform.

27. The method of claim 1, wherein dispensing includes dispensing the liquid in a radial direction while displacing gas between the inner surfaces of the substrates to the outer edges of the substrates so that the liquid layer is uniform without trapped gas bubbles.

28. The method of claim 1, wherein dispensing includes dispensing the liquid from one or more edges of square or rectangular-shaped substrates, or substrates having both straight and curved edges, while displacing gas between the inner longitudinal surfaces of the substrates to one or more opposing edges of the substrates so that the liquid has a defined thickness and is provided without trapped gas bubbles.

29. The method of claim 1, further comprising the step of treating the liquid to stabilize the medium.

30. The method of claim 29, wherein the liquid is polymerizable and treating includes using a heat treatment.

31. The method of claim 29, wherein the liquid is polymerizable and treating includes using actinic irradiation.

32. The method of claim 29, wherein the liquid is polymerizable and treating includes using UV irradiation.

33. The method of claim 29, wherein treating includes treating circular regions of the liquid medium.

34. The method of claim 33, wherein the circular regions are continuous tracks at or near the outer and the inner edges of the substrates.

35. The method of claim 33, wherein the circular regions are two or more continuous tracks of different radii about the center of the substrates.

36. The method of claim 29, wherein treating includes treating helical regions of the liquid medium.

37. The method of claim 29, wherein treating includes treating discrete regions of the liquid medium.

38. The method of claim 37, wherein the discrete regions are abutting each other.

39. The method of claim 37, wherein the, discrete regions are separate from each other, or partially overlapping with each other.

40. The method of claim 1, wherein dispensing is achieved by the use of capillary forces.

41. The method of claim 1, wherein dispensing includes applying compressive force to the liquid by application of positive pressure to the substrates so that the liquid flows towards the center and outer edge of substrates.

42. The method of claim 1, wherein dispensing includes injecting the liquid between the substrates while the substrates are stationary or spinning followed by spinning the substrates to cause the liquid medium to spread outward towards the outer edges of the substrates.

43. The method of claim 42, wherein dispensing includes applying compressive force to the liquid by application of positive pressure to the substrates in combination with spinning the substrates.

44. The method of claim 1, further comprising the step of securing the position of the substrates to maintain the state of parallelism between the outer longitudinal surfaces of the substrates.

45. A method for producing optical recording media, comprising the steps of:

placing each of at least two substrates on a respective support surface, each substrate having respective inner and outer longitudinal surfaces;

aligning the substrates relative to one or more reference positions;

positioning the substrates relative to each other to create a gap between the inner longitudinal surfaces of the substrates;

positioning the substrates to secure a state of parallelism between the outer longitudinal surfaces of the substrates;

dispensing a liquid to provide a medium between the inner longitudinal surfaces of the substrates, wherein during dispensing the liquid is in contact with inner longitudinal surfaces of the at least two substrates; and treating the liquid to stabilize the medium.

46. The method of claim 45, wherein the gap is defined with the use of at least one mechanical stop.

47. The method of claim 46, further comprising adjusting the location of the at least one mechanical stop with the aid of at least one linear distance sensor.

48. The method of claim 45, wherein the gap is defined by the use of one or more linear distance sensors.

49. The method of claim 45, wherein the gap is predetermined with the use of a set of spacers.

50. The method of claim 49, wherein the spacers are rigidly mounted onto one of the support surfaces.

51. The method of claim 49, wherein the spacers are variably mounted onto one of the support surfaces.

52. The method of claim 51, further comprising interactively adjusting the height of the spacers with the aid of an optical measuring device which measures the tilt angle of the substrates.

53. The method of claim 52, wherein using the optical measuring device includes adjusting the height of the support surfaces until surface reflections from the outer surfaces of the substrates are substantially co-linear.

54. The method of claim 45, wherein positioning the substrates to secure a state of parallelism includes using an optical measuring device which measures the tilt angle of the substrates, and adjusting the position of the support surfaces until surface reflection from the outer surfaces of the substrates are substantially co-linear.

55. An apparatus for producing recording media, comprising:

at least two platens, a first platen being movable relative to a second platen, and the first and second platens having respective first and second support surfaces onto which respective first and second substrates are placed, the first and second substrates each having inner and outer longitudinal surfaces;

an alignment device which aligns the respective substrates relative to a one or more reference positions;

a positioning system which provides a substantial degree of parallelism between the outer longitudinal surfaces of each of the substrates and produces a desired gap between the inner longitudinal surfaces of the substrates; and a dispensing unit which emits a liquid medium within the gap between inner longitudinal surfaces of the substrates, wherein during dispensing the liquid is in contact with inner longitudinal surfaces of the at least two substrates.

56. The apparatus of claim 55, further comprising a treating device for stabilizing the liquid medium.

57. The apparatus of claim 55, wherein the treating device uses UV radiation.

58. The apparatus of claim 55, wherein the treating device uses actinic radiation.

59. The apparatus of claim 55, wherein the treating device uses heat treatment.

60. The apparatus of claim 55, further comprising a locking device which secures in the desired degree of parallelism between the outer surfaces of the substrates.

61. The apparatus of claim 60, wherein the locking mechanism includes a ball that wedges between three tapered blocks to push the blocks against three rigid shafts of the positioning system to prevent movement of the three rigid shafts.

62. The apparatus of claim 55, wherein the dispensing unit includes a single reservoir that holds the liquid medium, the reservoir being connected to the centering device directly or with a tube that transmits the medium from the reservoir to the centering device.

63. The apparatus of claim 55, wherein the dispensing unit includes a multiplicity of reservoirs for holding a respective liquid medium, each reservoir being connected to the centering device directly or with a respective tube to transmit the respective medium from the reservoirs to the centering device.

64. The apparatus of claim 55, wherein the inner surface of each substrate is provided with a raised portion along the outer region of the substrates, the raised portions reducing the distance between the inner surfaces of the substrates.

65. The apparatus of claim 55, wherein the positioning system is a three-point positioning system.

66. The apparatus of claim 65, wherein the three-point positioning system includes rigid mounting spacers.

67. The apparatus of claim 65, wherein the three-point positioning system includes variable mounting spacers.

68. The apparatus of claim 55, wherein the positioning system includes at least one mechanical stop to define the gap.

69. The apparatus of claim 55, wherein the positioning system includes a linear distance sensor that defines the gap.

70. The apparatus of claim 55, wherein the positioning system includes an optical measuring device which measures the tilt angle of the substrates, the desired degree of parallelism being achieved when the optical measuring device determines that the surface reflection from the outer surfaces of the substrates are co-linear.

71. The apparatus of claim 55, wherein the centering device is applied through a respective inner diameter of the substrates.

72. An optical recording article, comprising:

at least two substrates; and a medium disposed between the inner longitudinal surfaces of the two substrates, the outer longitudinal surfaces of the substrates being substantially parallel, wherein the optical recording article is prepared by a process that includes the steps of:

positioning the substrates to create a gap between the inner longitudinal surfaces of the substrates while maintaining the secured state of parallelism of the outer longitudinal surfaces of the substrates; and dispensing a requisite amount of liquid to provide a medium between the inner longitudinal surfaces of the substrates, wherein during dispensing the liquid is in contact with inner longitudinal surfaces of the at least two substrates.

73. The article of claim 72, wherein the substrates are circular disks.

74. The article of claim 72, wherein the substrates have a center hole.

75. The article of claim 72, wherein the substrates are square shaped, rectangular shaped, or oval shaped.

76. The article of claim 72, wherein the substrates have at least one straight edge.

77. The article of claim 72, wherein the substrates have at least one curved edge.

78. The article of claim 72, wherein the substrates are glass.

79. The article of claim 72, wherein the substrates are plastic.

80. The article of claim 72, wherein the substrates have a thickness of about between 0.1 mm to 5 mm and have a flatness of about between 1/10 to 20 waves per inch.

81. The article of claim 72, wherein the substrates have a thickness of about between 0.1 mm to 5 mm and have a parallelism between the longitudinal outer surfaces of about between 10 $\mu$radians and 5000 $\mu$radians.

82. The article of claim 72, wherein the inner surface of each substrate is provided with a raised portion along the outer region of the substrates, the raised portions reducing the distance between the inner surfaces of the substrates.

83. The method of claim 29 wherein the substrates have a parallelism between the longitudinal outer surfaces of about between 10 $\mu$radians to 5000 $\mu$radians.

84. The method of claim 1 wherein at least three or more substrates are disposed on opposing support surfaces, the substrates having respective inner and outer longitudinal surfaces; and during dispensing the liquid is in contact with inner longitudinal surfaces of the at least three substrates.

* * * * *